G. J. & H. C. GARRETT.
VEHICLE WHEEL.
APPLICATION FILED JULY 25, 1912.

1,072,597.

Patented Sept. 9, 1913.

2 SHEETS—SHEET 1.

WITNESSES
R. E. Finyan
R. E. Randle

INVENTORS
Gloster J. Garrett
Herbert C. Garrett
By Robert W. Randle
ATTORNEY

G. J. & H. C. GARRETT.
VEHICLE WHEEL.
APPLICATION FILED JULY 25, 1912.
1,072,597.
Patented Sept. 9, 1913.
2 SHEETS—SHEET 2.
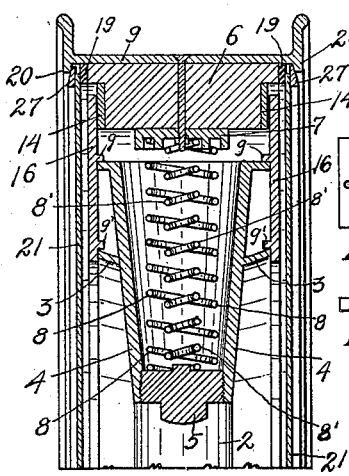
Fig. 3.
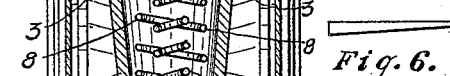
Fig. 5.
Fig. 6.
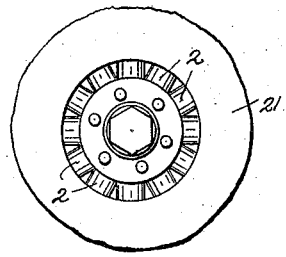
Fig. 7.
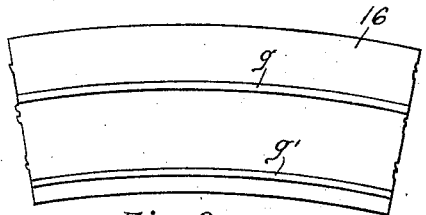
Fig. 8.
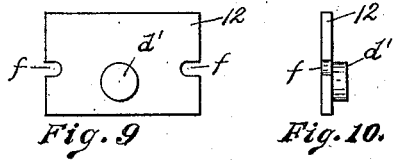
Fig. 9.
Fig. 10.
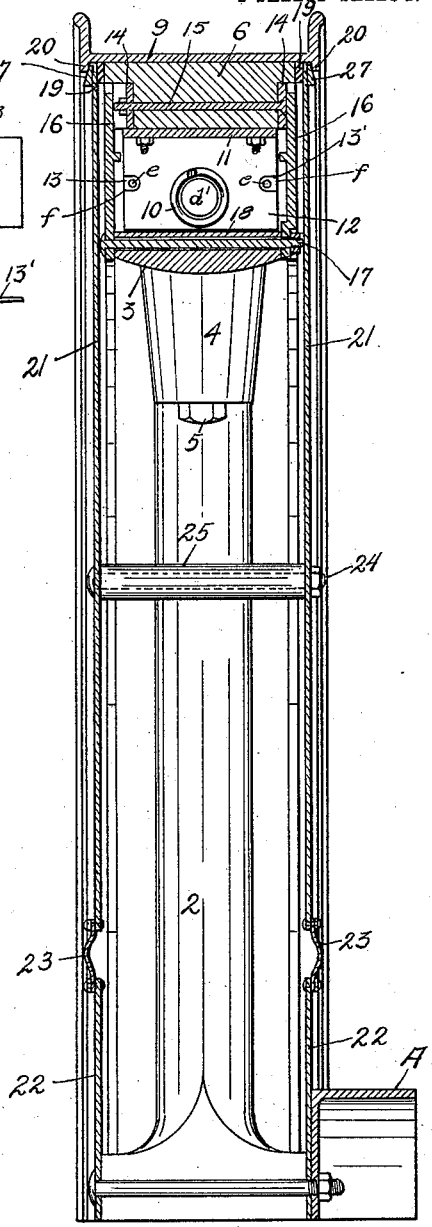
Fig. 4.
WITNESSES
R. E. Fryar.
R. E. Randle.
Gloster J. Garrett
Herbert C. Garrett
INVENTORS.
By Robert W. Randle
ATTORNEY.

UNITED STATES PATENT OFFICE.

GLOSTER J. GARRETT AND HERBERT C. GARRETT, OF RICHMOND, INDIANA.

VEHICLE-WHEEL.

1,072,597.     Specification of Letters Patent.     Patented Sept. 9, 1913.

Application filed July 25, 1912. Serial No. 711,411.

*To all whom it may concern:*

Be it known that we, GLOSTER J. GARRETT and HERBERT C. GARRETT, both residing in the city of Richmond, in the county of Wayne and State of Indiana, have invented certain new and useful Improvements in Vehicle-Wheels; and we do hereby declare the following to be a full, clear, and comprehensive exposition of the same, being such as will enable others to make and use the same with absolute exactitude.

Our present invention relates to wheels intended more particularly for automobiles or other vehicles wherein a maximum of resiliency is desired with a minimum of expense.

The object of our present invention, broadly speaking, is to provide a vehicle-wheel which will dispense with the ordinary pneumatic tires, at same time providing a wheel which will be strong and durable in construction, neat and attractive in appearance, light in weight, and which can be manufactured and sold at a comparatively low price.

A more particular object is to provide certain new and useful improvements in the construction over that set forth in our prior application filed March 11, 1912, Ser. No. 682,903, now in Div. 41, Room 125, same being indicated for allowance.

The preferred manner for the construction of our invention in a practical and mechanical manner is shown in the accompanying two sheets of drawings, in which—

Figure 1:
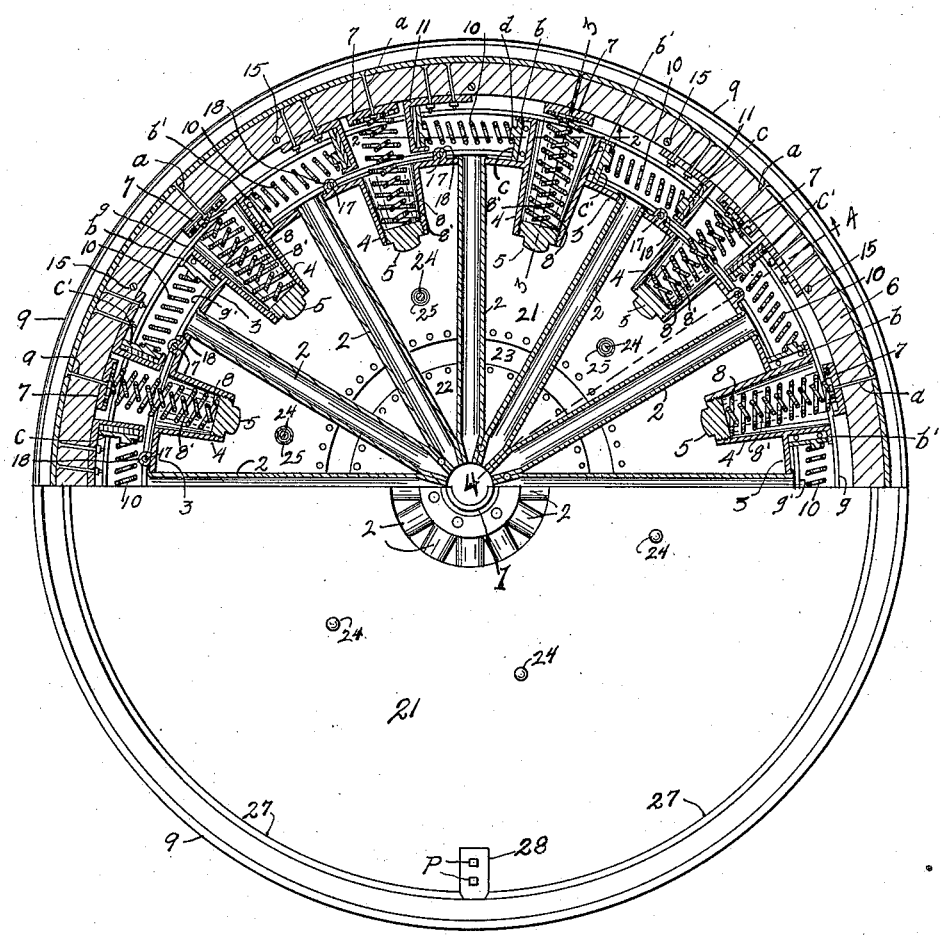
Figure 2:
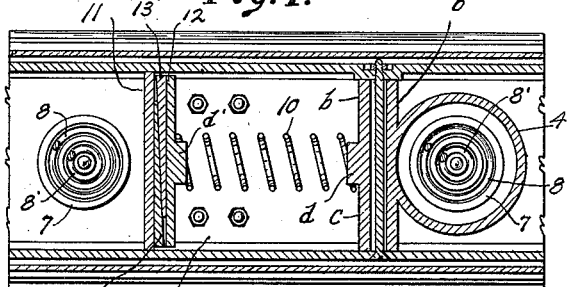

Figure 1 is a face view showing one of our wheels in elevation, a portion of the outer plate being removed to show the interior arrangements of the wheel. Fig. 2 is a sectional detail view as taken on line 2—2 of Fig. 1. Fig. 3 is an enlarged detail sectional view as taken on line 3—3 of Fig. 1. Fig. 4 is an enlarged sectional view, as taken on line 4—4 of Fig. 1. Fig. 5 is a face view of one of the wedges; and Fig. 6 is an edge view of the same. Fig. 7 shows a slight modification in the manner of forming the guards, in this instance they do not extend over the hub. Fig. 8 is an inner face elevation of a portion of one of the friction rings. Fig. 9 is a face view of one of the plates for the cross springs; and Fig. 10 is an edge elevation of the same.

Similar indices denote like parts throughout the several views.

In order that the construction and the operation of our invention may be more fully understood and appreciated we will now take up a detailed description thereof, in which we will set forth the various features as briefly and as comprehensively as we may.

Referring now to the drawings, numeral 1 denotes the hub, from which radiate a plurality of round tubular spokes 2 which are spaced an equal distance apart therearound. Numeral 3 denotes the inner rim to which the outer ends of all of the spokes are attached in any well known manner. Carried by the rim 3 are a plurality of tapering sockets 4, which open therethrough, one of which is located between each two of the spokes. Each alternate socket projects both inward and outward from the rim 3 as shown, while the others project only inward from the rim. The inner end of each of said sockets is adapted to be closed by a removable screw-plug 5.

Numeral 6 designates the outer rim which is normally concentric with the rim 3 and it is spaced some distance therefrom. Located opposite each of the sockets 4 is a plate 7, each being secured by a bolt $a$ to the inner periphery of the rim 6. Two seats are formed in each of said plates 7 for the springs 8 and 8'. Seated in each of the sockets 4 is a pair of helical springs 8 and 8', which are concentric with each other, the latter being located within the convolutions of the former, the convolutions of one being disposed opposite to that of the other, as shown most clearly in Fig. 3. The outer ends of each pair of said springs is seated in the plate 7, and their inner ends are seated against the inner face of the plug 5. Secured around on the periphery of the rim 6 is the tire-band 9 which should be adapted to carry a rubber tire as desired. The tension of the springs 8 and 8' tend at all times to push the rim 6 outward to its maximum distance from the rim 3, yet allowing the inner rim to move radially while the outer rim remains relatively stationary. The tension of the springs 8 and 8' may be varied as desired by turning the plugs 5 inward or outward. Each alternate socket is different near the inner rim than are the ones on each side thereof, the one immediately to the right of the center in Fig. 1 being a major socket and the one on the left is a minor socket. The minor sockets terminate at the rim from which they project centerward, while the major sockets extend farther outward beyond the inner rim, and then turn to the right and the left parallel to the rims thereby forming the respective flanges $b$ and $b'$ on each side thereof. Located between each of said flanges $b$ and $b'$ and the rim 3 is a head: $c$ and $c'$, respectively. Extending out from the face of the head $c$ is a lug $d$ to hold the cross spring 10 in place. Secured to the inner periphery of the rim 6, by bolts as shown, is an L-shaped clip 11, one for each spring 10, in which is carried the movable head 12 which has a lug $d'$ to hold the other end of the spring 10 in place. The spring 10 extends across between the heads $c$ and 12 and it is tensioned to spread said heads apart. The tension of said spring may be varied, however, by means of the wedges 13 and 13' which are adapted to be driven in between the clip 11 and the head 12, as shown in Fig. 2. Said wedges have a small hole in one end thereof which is located to come opposite one of the notches $f$ formed in the ends of the movable head 12 as shown in Fig. 9.

From the above it is apparent that the inner and the outer rims are resiliently connected in a circumferential direction by the springs 10, one of said springs pressing in one direction and the next thereto in the opposite direction, whereby the springs 10 counterbalance each other throughout the circumference of the wheel.

Formed in each side of the rim 6 is a channel in each of which is fitted a friction ring 14, as shown in Fig. 3, same being secured to the rim 6 at frequent distances apart by the bolts 15. One of said rings 14 is offset, as shown in Fig. 4, at each bolt 15, in order that the nuts of said bolts will not project out beyond the face of the rim.

Slidably contacting with each of the rings 14 is the ring-plates 16 which are secured to the edges of the rim 3 by the bolts 17, there being ridges 18 (Fig. 1) extending across on the outer face of the rim 3 through which an aperture is formed for said bolt. Two ribs, $g$ and $g'$, are formed around on the contact faces of the ring-plates, the former fitting over the edges of the upper ends of the major sockets, and the latter fitting over the edges of the rim 3, all as shown in Fig. 3.

Secured to the sides of the rim 6, adjoining the tire-band 9, is the resilient gasket 19 which is opposite the lips 20, the latter extending centerward from and formed integral with the band 9, as shown in Figs. 3 and 4.

The disks 21 are adapted to cover the interior of the wheel, in order to exclude dirt and water. Said disks 21 terminate some distance away from the hub or the center of the wheel. Extending outward from the hub or the center of the wheel are the inner disks 22, as shown in Fig. 4, which extend outward to within a short distance of and in alinement with the disks 21. The disks 21 and 22 are connected by a leather or other flexible ring 23 by which the disks 21 and 22 may move edgewise independent of each other. The two disks 21 should be connected at intervals by bolts 24, said disks being spaced apart by the thimbles 25 through each of which one of the bolts 24 extends, thereby allowing the bolts 24 to be tightened upon the disks yet preventing the disks from being pressed too near together.

The brake drum is denoted by letter A.

The means for excluding dirt and moisture from the interior of the wheel may be accomplished in several ways, but preferably as that described, in certain instances the outer disk may extend entirely over the end of the hub of the wheel, as in Fig. 4, or it may extend only to a point near the hub or cap of the wheel, as shown in Fig. 7, which allows the hub or cap to project out farther than does the outer disk 21. The size of the disks 21 is such that their peripheries fit around against the band 9, and they are retained in place by their respective open-rings 27 which are wedge-shape in cross section and they are adapted to fit in between the disk 21 and the lip 20 as shown in Figs. 3 and 4. Said ring 27 is adapted to be tightly secured in place by the wedge 28, as in Fig. 1, which is inserted between the ends of the ring 27, after which it is secured to the disk 21 by a pair of set-screws $p$.

After the several parts have been arranged as shown and described it will be manifest that we provide a wheel wherein all of the parts will work together with perfect synchronism, each fulfilling the part for which it is intended. The proportionate weight of the vehicle and its load will of course all come upon the hub and from there it will be transmitted through the spokes to the inner rim 3, and from the latter the weight will be transmitted resiliently through the springs to the outer rim or tire. At any given time the weight will manifestly be carried by the lower vertical springs 8 and 8' and the two sets of like springs located on each side thereof, and also by certain of the side or cross springs 10, the latter allowing the whole central portion of the wheel to be moved up and down independent of the outer rim or the tire of the wheel.

We desire that it be understood that various changes may be made in the several details of construction from that herein shown and described without departing from the spirit of our invention or sacrificing any of the advantages thereof.

Having now fully shown and described the best means for the construction of our invention known at this time, what we claim and desire to secure by Letters Patent of the United States, is—

A vehicle wheel comprising an outer rim for carrying a tire, an inner rim which is movable with relation to the outer rim but is normally concentric therewith, a central hub, spokes rigidly connecting the hub and the inner rim, a plurality of tapering major and minor sockets projecting centerward from the inner rim and formed integral therewith, a removable plug for closing the inner end of each socket, a plate located opposite each of said plugs and secured to the inner periphery of the outer rim, a pair of helical springs located in each of said sockets, one spring of the pair being located within the other and coiled opposite thereto, both springs of each pair being seated at their inner ends on one of said plugs and the other ends thereof being seated on one of said plates, a cross spring located between each two pairs of the first named springs and adapted to counterbalance each other and retain the pairs of springs central of their sockets, and means for inclosing the interior of the wheel, all substantially as shown and described.

In testimony whereof we have hereunto subscribed our names to this specification in the presence of two subscribing witnesses.

GLOSTER J. GARRETT.
HERBERT C. GARRETT.

Witnesses:
ROBERT W. RANDLE,
R. E. RANDLE.